United States Patent
Song

(10) Patent No.: US 11,320,960 B2
(45) Date of Patent: May 3, 2022

(54) ICON DISPLAY METHOD, DEVICE, AND TERMINAL

(71) Applicant: GUANGDONG OPPO MOBILE TELECOMMUNICATIONS CORP., LTD., Guangdong (CN)

(72) Inventor: Fang Song, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/087,014

(22) Filed: Nov. 2, 2020

(65) Prior Publication Data

US 2021/0048939 A1 Feb. 18, 2021

Related U.S. Application Data

(63) Continuation-in-part of application No. PCT/CN2019/088622, filed on May 27, 2019.

(30) Foreign Application Priority Data

Jun. 8, 2018 (CN) .................. 201810590145.X

(51) Int. Cl.
 *G06F 3/04817* (2022.01)
 *A63F 13/537* (2014.01)
 (Continued)

(52) U.S. Cl.
 CPC ........ *G06F 3/04817* (2013.01); *A63F 13/537* (2014.09); *G06F 3/0482* (2013.01);
 (Continued)

(58) Field of Classification Search
 CPC .. G06F 3/04817; G06F 3/04886; G06F 9/451; G06F 16/9535; G06F 3/0482;
 (Continued)

(56) References Cited

U.S. PATENT DOCUMENTS 9,075,508 B1 * 7/2015 Cronin ................. G06F 3/0481
9,247,014 B1   1/2016 Rao
(Continued)

FOREIGN PATENT DOCUMENTS

CN   105653138   6/2016
CN   106155721   11/2016
(Continued)

OTHER PUBLICATIONS

SIPO, First Office Action for CN Application No. 201810590145.X, dated Sep. 20, 2019.
(Continued)

*Primary Examiner* — Roberto Borja
(74) *Attorney, Agent, or Firm* — Hodgson Russ LLP

(57) ABSTRACT

The embodiments of the disclosure provide an icon display method, device and terminal. The method includes: displaying a user interface of a first application program; receiving a call out command, the call out command being configured to request to call out a target icon set; and displaying the target icon set according to the call out command, the target icon set comprising one or more target icons corresponding to the first application program. The technical solutions provided in the embodiments of the application realize that the icons, needed to be displayed, are dynamically adjusted based on different running applications, so that the icons can be displayed more freely and the operating requirements can be met better.

18 Claims, 11 Drawing Sheets

(51) Int. Cl.
*G06F 9/451* (2018.01)
*G06F 3/0482* (2013.01)
*G06F 3/04886* (2022.01)
*G06F 3/04847* (2022.01)
*G06F 3/0488* (2022.01)
*G06F 3/0486* (2013.01)
*G06F 16/9535* (2019.01)

(52) U.S. Cl.
CPC ........ *G06F 3/0486* (2013.01); *G06F 3/04886* (2013.01); *G06F 9/451* (2018.02); *G06F 16/9535* (2019.01); *G06F 3/0488* (2013.01); *G06F 3/04847* (2013.01); *G06F 2203/04803* (2013.01)

(58) Field of Classification Search
CPC ....... G06F 2203/04803; G06F 3/04847; G06F 3/0488; G06F 3/0486; A63F 13/537; G09G 3/03
See application file for complete search history.

(56) References Cited

U.S. PATENT DOCUMENTS

| | | | | |
|---|---|---|---|---|
| 10,261,672 | B1* | 4/2019 | Dolbakian | G06F 3/04817 |
| 2009/0113333 | A1 | 4/2009 | Dellinger et al. | |
| 2010/0077347 | A1 | 3/2010 | Kirtane et al. | |
| 2013/0080890 | A1* | 3/2013 | Krishnamurthi | H04W 4/20 715/702 |
| 2013/0326391 | A1 | 12/2013 | Chen et al. | |
| 2014/0013271 | A1 | 1/2014 | Moore et al. | |
| 2014/0101617 | A1* | 4/2014 | Yang | G06F 3/04817 715/846 |
| 2015/0193129 | A1* | 7/2015 | Cho | G06F 3/0482 715/739 |
| 2015/0346899 | A1* | 12/2015 | Jung | G06F 3/1423 345/173 |
| 2016/0179341 | A1* | 6/2016 | Cho | G06F 3/04817 715/760 |
| 2017/0168655 | A1 | 6/2017 | Jann et al. | |
| 2018/0004371 | A1* | 1/2018 | Han | G06F 9/451 |
| 2018/0052571 | A1* | 2/2018 | Seol | G06F 3/0482 |
| 2018/0219987 | A1* | 8/2018 | Pantel | G09G 3/2092 |
| 2018/0225132 | A1* | 8/2018 | Pierce | G06F 9/453 |
| 2019/0050490 | A1* | 2/2019 | Kuh | G06F 3/04842 |

FOREIGN PATENT DOCUMENTS

| | | |
|---|---|---|
| CN | 106293813 | 1/2017 |
| CN | 106648369 | 5/2017 |
| CN | 106775755 | 5/2017 |
| CN | 107111421 | 8/2017 |
| CN | 107526490 | 12/2017 |
| CN | 108040145 | 5/2018 |
| CN | 108111687 | 6/2018 |
| CN | 108874485 | 11/2018 |

OTHER PUBLICATIONS

SIPO, Second Office Action for ON application No. 201810590145.X, dated May 15, 2020.
SIPO, Third Office Action for CN application No. 201810590145.X, dated Sep. 1, 2020.
SIPO, Supplementary search report for CN Application No. 201810590145.X, dated Jan. 16, 2020.
WIPO, International Search Report for PCT/CN2019/088622, dated Aug. 30, 2019.
SIPO, Fourth Office Action for CN Application No. 201810590145.X, dated Mar. 30, 2021.
EPO, Extended European Search Report for EP Application No. 19816093.9, dated May 3, 2021.
CNIPA, Fifth Office Action for CN Application No. 201810590145.X, dated Jun. 18, 2021.
CNIPA, Decision of Rejection for CN Application No. 201810590145.X, dated Oct. 11, 2021.
IPI, Office Action for IN Application No. 202017048507, dated Dec. 8, 2021.

* cited by examiner

US 11,320,960 B2

ICON DISPLAY METHOD, DEVICE, AND TERMINAL

CROSS-REFERENCE TO RELATED APPLICATION(S)

This application is a continuation-in-part of International Application No. PCT/CN2019/088622, filed May 27, 2019, which claims priority to Chinese Patent Application No. 201810590145.X, filed Jun. 8, 2018, the entire disclosures of which are incorporated by reference herein.

TECHNICAL FIELD

The present disclosure relates to the field of human-computer interaction technologies, and more particularly, to an icon display method, an icon display device, and a terminal.

BACKGROUND

At present, when a user uses a terminal such as a mobile phone or a tablet computer, a display menu can be invoked to do some operations through the menu.

In the related art, the user performs a sliding operation on a side of a screen of the terminal, and the terminal calls out the display menu according to the received operation signal, and displays several preset function icons in the menu. For example, the aforementioned function icons may include a flashlight icon, a Bluetooth icon, a screenshot icon, and the like.

SUMMARY

The present disclosure provides an icon display method, an icon display device, and a terminal. The technical solutions are as follows.

In an aspect, an icon display method is provided. The method comprising:
displaying a user interface of a first application program;
receiving a call out command, the call out command being configured to request to call out a target icon set; and
displaying the target icon set according to the call out command, the target icon set comprising one or more target icons corresponding to the first application program.

In another aspect, an icon display device is provided. The device comprises:
an interface display module, configured for displaying a user interface of a first application program;
a command receiving module, configured for receiving a call out command, the call out command being configured to request to call out a target icon set; and
an icon display module, configured for displaying the target icon set according to the call out command, the target icon set comprising one or more target icons corresponding to the first application program.

In still another aspect, a terminal is provided. The terminal comprises a processor and a memory; the memory stores a computer program, the computer program is loaded and executed to perform the above icon display method.

In still another aspect, a computer readable medium is provided. The computer readable medium comprises a computer program stored therein, the computer program being loaded and executed to perform the above icon display method.

The beneficial effects brought about by the technical solutions provided by the embodiments of the application include the follows.

The application obtains and displays one or more icons corresponding to one or more application programs running in the foreground, when receiving a call out command. Compared to the related art in which several predetermined functional icons are invariably displayed in the menu, the technical solutions provided in the embodiments of the application realize that the icons, needed to be displayed, are dynamically adjusted according to different applications, so that the icons can be displayed more freely and the operating requirements can be met better.

DETAILED DESCRIPTION OF PREFERRED EMBODIMENTS

In order to make the purposes, technical solutions and advantages of this disclosure clearer, the embodiments of the disclosure will be further described in detail below with reference to the accompanying drawings.

Figure 1:
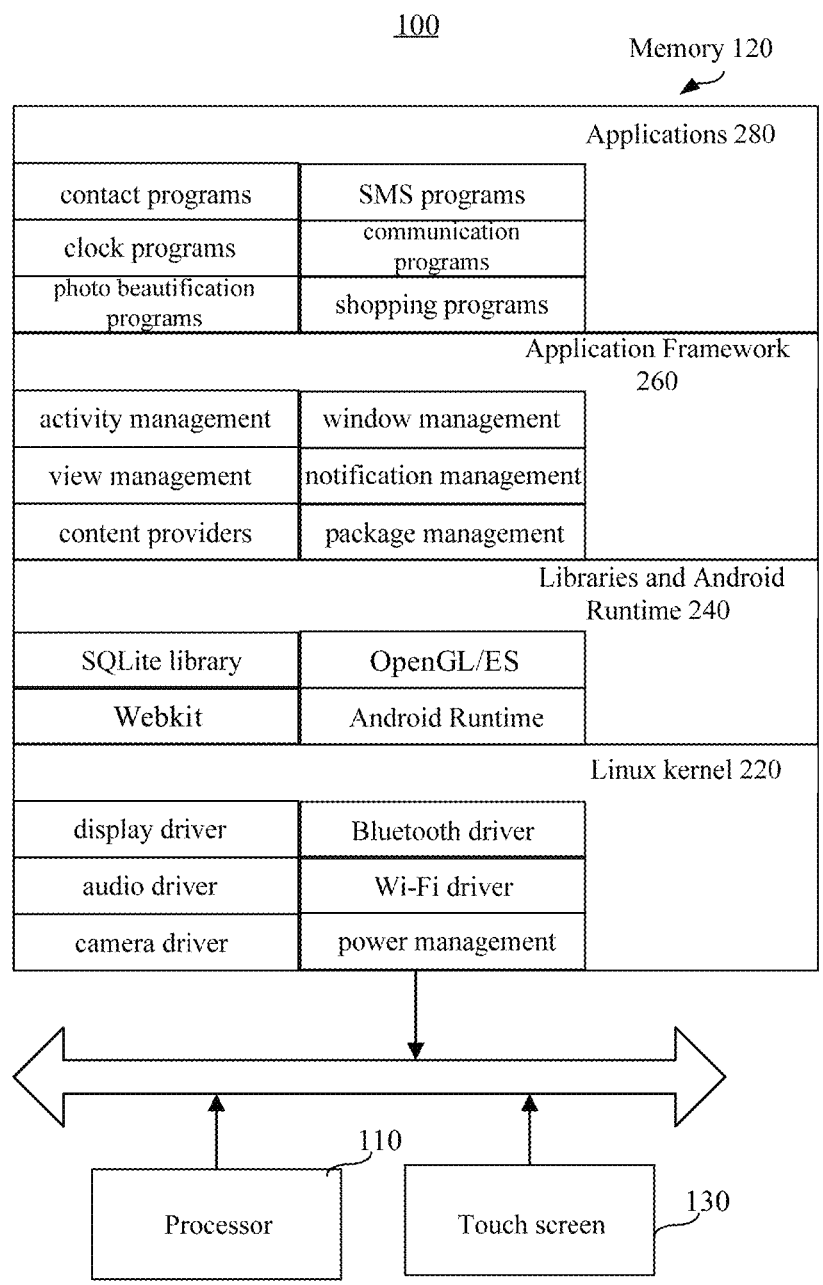
FIG. 1 is a structural diagram of a terminal according to an embodiment of the disclosure.
Figure 2:
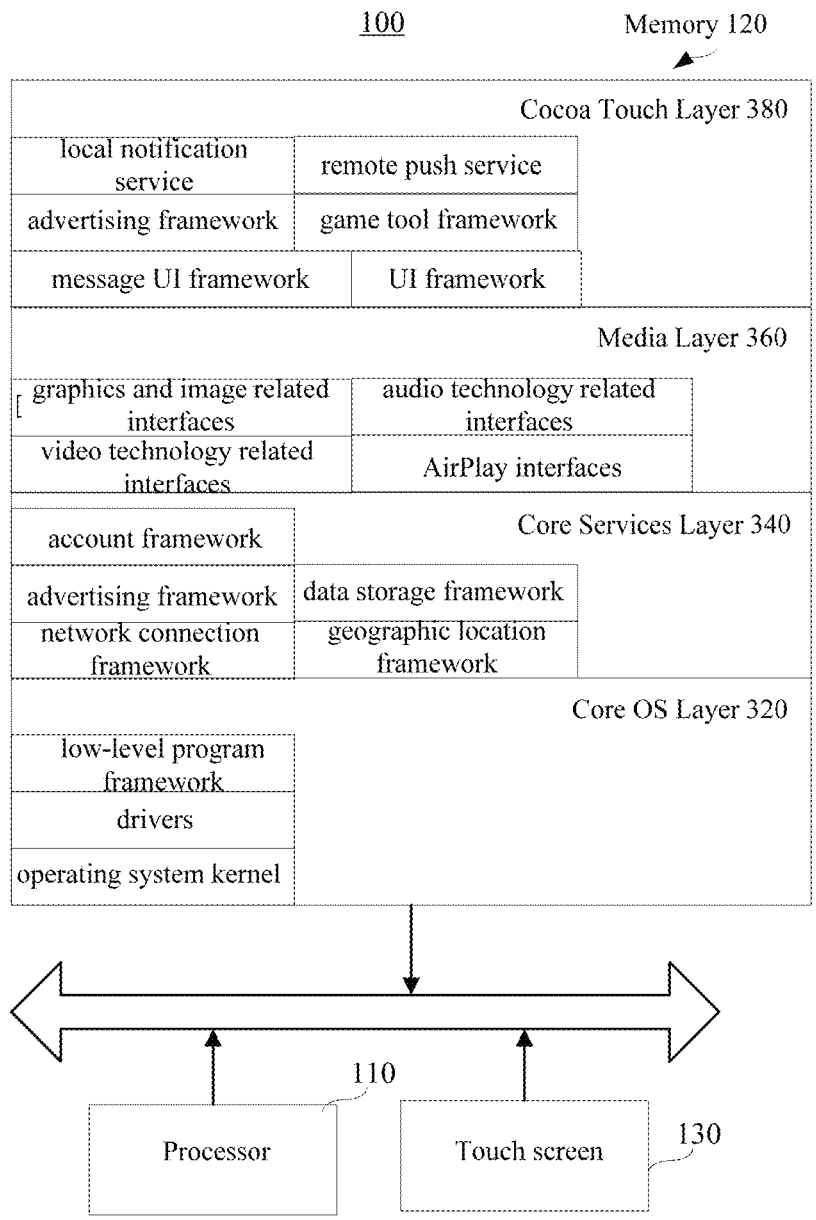
FIG. 2 is a structural diagram of a terminal according to another embodiment of the disclosure.

FIG. 1 and FIG. 2 illustrate structural block diagrams of a terminal 100 according to an embodiment of the disclosure. The terminal 100 may be a mobile phone, a tablet computer, a notebook computer, an e-book or the like. The terminal 100 of the disclosure may include one or more of the following components: a processor 110, a memory 120, and a touch screen 130.

The processor 110 may include one or more processing cores. The processor 110 uses various interfaces and lines to connect various parts of the entire terminal 100, and executes the various functions and data processing of the terminal 100 by running or executing instructions, programs, code sets or instruction sets stored in the memory 120 and by calling data stored in the memory 120. Optionally, the processor 110 may use at least one hardware form of Digital Signal Processing (DSP), Field-Programmable Gate Array (FPGA), and Programmable Logic Array (PLA) to implement the executions. The processor 110 may integrate one or more of a Central Processing Unit (CPU), a Graphics Processing Unit (GPU), and a modem. The CPU mainly handles the operating system, user interfaces, and application programs; the GPU is responsible for rendering and drawing of the content required to be displayed by the touch screen 130; and the modem is used for processing wireless communication. It can be understood that the modem may not be integrated into the processor 110, and may be implemented by a single chip.

The memory 120 may include Random Access Memory (RAM), and may also just include Read-Only Memory. Optionally, the memory 120 includes a non-transitory computer-readable storage medium. The memory 120 may be used to store instructions, programs, codes, code sets, or instruction sets. The memory 120 may include a program storage area and a data storage area. The program storage area may be configured to store instructions for implementing an operating system, instructions for at least one function such as a touch function, a sound playback function, an image playback function, etc., or instructions for implementing the following method embodiments. The data storage area may store data such as audio data, phone book and the like that are created by the use of the terminal 100.

Taking the operating system is an Android system as an example, the programs and data stored in the memory 120 are shown in FIG. 1. The memory 120 stores the Linux kernel 220, the Libraries and Android Runtime 240, the Application Framework 260 and Applications 280. The Linux kernel 220 provides low-level drivers for various hardware of the terminal 100, such as a display driver, an audio driver, a camera driver, a Bluetooth driver, a Wi-Fi driver, and power management. The Libraries and Android Runtime 240 provides main feature support for the android system through some C/C++ libraries. For example, the SQLite library provides the support of database, the OpenGL/ES library provides the support of 3D drawing, and the Webkit library provides the support of browser kernel. The Libraries and Android Runtime 240 also provides the Android Runtime, which mainly provides some core libraries, which can allow developers to write Android applications using the Java language. The Application Framework 260 provides various APIs that may be used when building applications. Developers can also use these APIs to build their own applications, such as activity management, window management, view management, notification management, content providers, Package management, call management, resource management, location management. There is at least one application program running in the Applications 280, and the at least one application program may be programs come with the operating system, such as a contact program, an SMS program, a clock program, a camera application, etc.; the at least one application program may be applications developed by third-party developers, such as an instant messaging program, a photo beautification program, etc.

Taking the operating system is an IOS system as an example, the programs and data stored in the memory 120 are show in FIG. 2. The IOS system includes a Core OS Layer 320, a Core Services Layer 340, a Media Layer 360 and a Cocoa Touch Layer 380. The Core OS Layer 320 includes an operating system kernel, drivers, and low-level program frameworks. These low-level program frameworks provide functions closer to hardware for the program frameworks located in the Core Services Layer 340 to use. The Core Services Layer 340 provides system services and/or program frameworks required by application programs, such as a foundation framework, an account framework, an advertising framework, a data storage framework, a network connection framework, a geographic location framework, a motion framework, and the like. The Media Layer 360 provides audio-visual-related interfaces for applications, such as graphics and image related interfaces, audio technology related interfaces, video technology related interfaces, and audio and video transmission technologies such as AirPlay interfaces. The Cocoa Touch Layer 380 provides various commonly used interface-related frameworks for application development, and implements user touch interaction operations on the terminal 100, such as providing: local notification service, remote push service, advertising framework, game tool framework, message user interface (UI) framework, user interface UIKit framework, map framework, etc.

The frameworks illustrated in FIG. 2, in which related to most applications but are not limited to, are the basic framework of the Core Services Layer 340 and the UIKit framework of the Cocoa Touch Layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the basic framework of the applications for building user interfaces, drawings, processing interaction events with the user, responding to gestures, etc.

The touch screen 130 is configured to receive touch operations on or near it by the user using a finger, a touch pen, or any suitable object, and to display respective user interfaces of applications. The touch screen 130 is generally disposed on a front panel of the terminal 100. The touch screen 130 may be designed as a full screen, a curved surface screen or a special-shaped screen. The touch screen 130 can also be designed as a combination of the full screen and the curved screen, and a combination of the special-shaped screen and the curved screen, which is not limited in this embodiment.

Full Screen

The full screen may refer to a screen design in which the touch screen 130 occupies the front panel of the terminal 100 with a screen-to-body ratio exceeding a threshold (such as 80% or 90% or 95%). A method for calculating the screen-to-body ratio is: (the area of the touch screen 130/the area of the front panel of the terminal 100)*100%; another method for calculating the screen-to-body ratio is: (the area of an actual display area in the touch screen 130/the area of the front panel of the terminal 100)*100%; still another method for calculating the screen-to-body ratio is: (a diagonal line of the touch screen 130/a diagonal line of the front panel of the terminal 100)*100%. For example, as shown in FIG. 3, the touch screen 130 occupies almost all areas on the front panel of the terminal 100, that is, except for the edges generated by the middle frame 41, all other areas of the front panel 40 of the terminal 100 are the touch screen 130. The four corners of the touch screen 130 may be right-angled or rounded.

The full screen may also be a screen design in which at least one component of the front panel is integrated inside or below the touch screen 130. Optionally, the at least one front panel component includes a camera, a fingerprint sensor, a proximity light sensor, a distance sensor, and the like. In some embodiments, other components of the front panel of the conventional terminal may be integrated in all or part of the touch screen 130. For example, the photosensitive component in the camera may be separated into multiple photosensitive pixels, each photosensitive pixel can be integrated in a black area of respective display pixel in the touch screen 130. Due to the at least one component of the front panel is integrated into the touch screen 130, the full screen may have a higher screen-to-body ratio.

In other embodiments, the component of the front panel of the conventional terminal can also be set on the side or the back of the terminal 100. For example, an ultrasonic fingerprint sensor may be set under the touch screen 130, a bone-conduction receiver can be set inside the terminal 100, and a camera can be set as a pluggable structure disposed on the side of the terminal 100.

In some optional embodiments, when the terminal 100 adopts the full screen, one or more edge touch sensors may be disposed at one side, two sides (such as the left and the right sides), or four sides (such as the upper, the lower, the left and the right sides) of the middle frame of the terminal 100. The edge touch sensor is configured to detect at least one of the operations, including a touch operation, a click operation, a press operation and a slide operation, on the middle frame by the user. The edge touch sensor may be any one of a touch sensor, a thermal sensor and a pressure sensor. And the user can operate on the edge touch sensor to control the applications in the terminal 100.

Curved Surface Screen

Figure 3A:
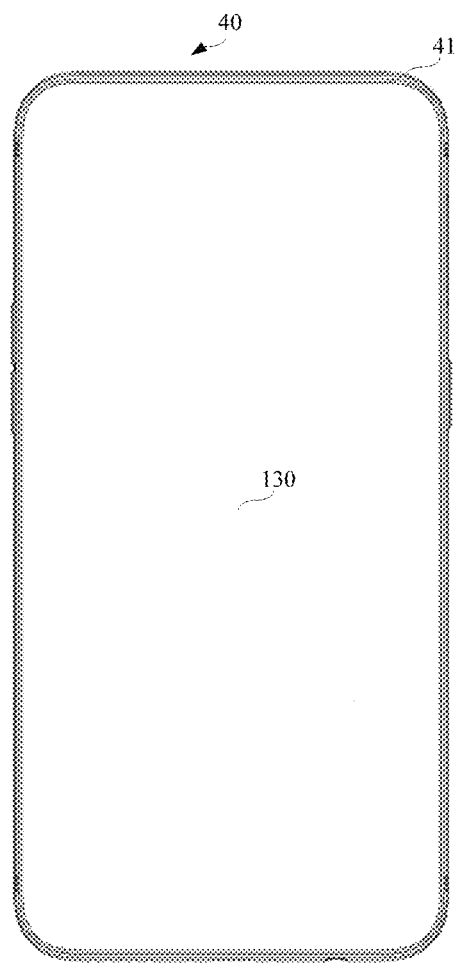
FIG. 3A to FIG. 3F are schematic diagrams showing the appearance of terminals with different touch screens according to embodiments of the disclosure.
Figure 3B:
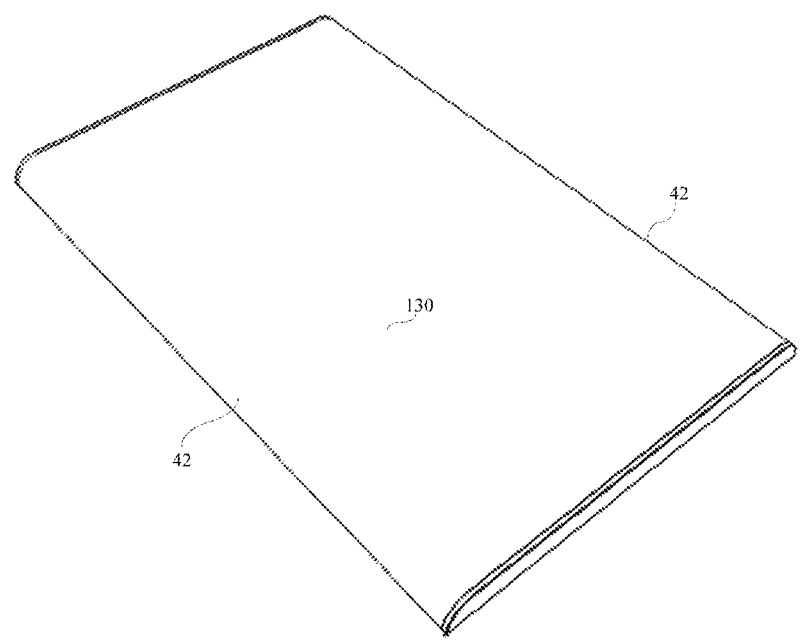

The curved surface screen refers to a screen design in which a display area of the touch screen 130 is not located in a plane. Generally, the curved surface screen is a screen design which has a cross section curved in shape, and the projection of the curved surface screen in any plane direction perpendicular to the cross section is a plane, wherein the curved shape may be U-shaped. Optionally, the curved surface screen refers to that at least one side of the touch screen 130 extends and covers the middle frame of the terminal 100. Since the side of the touch screen 130 extends and covers the middle frame of the terminal 100, the middle frame that originally has no display function and touch function is covered to be displayable area and/or operable area, so that the curved surface screen has a higher screen-to-body ratio. Optionally, in the embodiment as shown in FIG. 3B, the curved surface screen refers to a screen design that the left and right sides 42 are curved in shape, or the curved surface screen refers to a screen design that the upper and lower sides are curved in shape, or the curved surface screen refers to a screen design that four sides of the upper side, the lower side, the left side and the right side are curved in shape. In alternative embodiments, the curved surface screen is made of materials with a certain flexibility.

Special-Shaped Screen

The special-shaped screen is a touch screen with an irregular shape, the irregular shape is not a rectangle or a rounded rectangle. Optionally, the special-shaped screen refers to a screen design that has protrusions, notches, and/or holes on the rectangular or rounded rectangular touch screen 130. Optionally, the protrusions, notches, and/or holes can be located at an edge of the touch screen 130, a central portion of the touch screen 130, or both of the edge and the central portion of the touch screen 130. When the protrusions, notches and/or holes is/are defined at one edge, it can be set at the middle position or two ending position of the edge; when the protrusions, notches and/or holes is/are defined at the central portion of the screen, it can be set at one or more of the regions including the upper region, the upper left region, the left region, the lower left region, the lower region, the lower right region, the right region, and the upper right region of the screen. The protrusions, notches and/or holes is/are be distributed either centrally or decentrally, symmetrically or asymmetrically, when defined in multiple regions. Optionally, the number of the protrusions, notches and/or holes is not limited.

The special-shaped screen include the upper frontal area and/or the lower frontal area of the touch screen as the displayable area and/or the operable area, it makes the touch screen occupies more space on the front panel of the terminal, so that the special-shaped screen has a larger screen-to-body ratio. In some embodiments, the notches and/or holes are used to accommodate at least one component of the front panel, which includes at least one of a camera, a fingerprint sensor, a proximity light sensor, a distance sensor, an earpiece, an ambient light sensor, and a physical button.

Figure 3C:
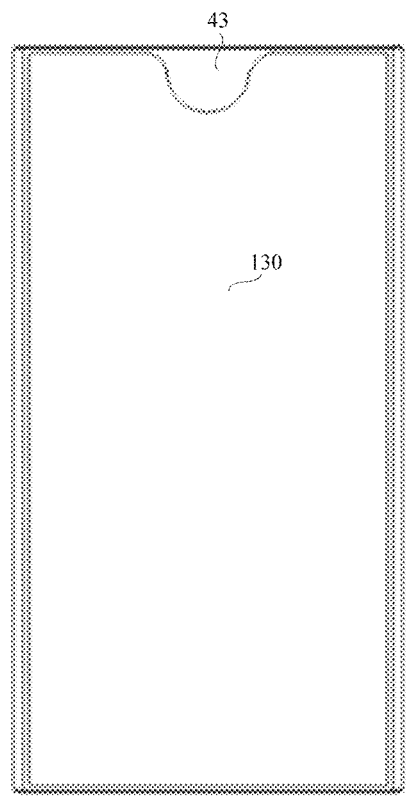
Figure 3D:
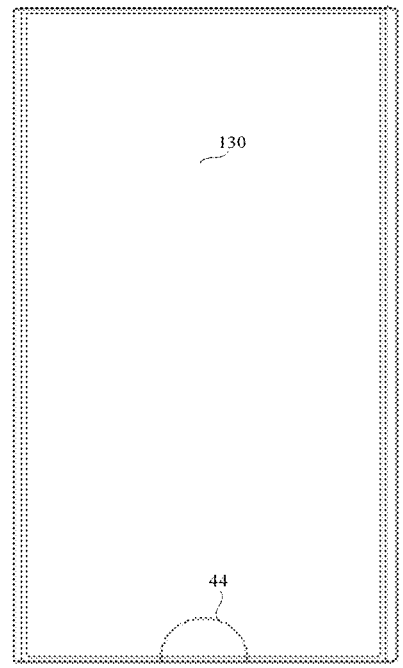
Figure 3E:
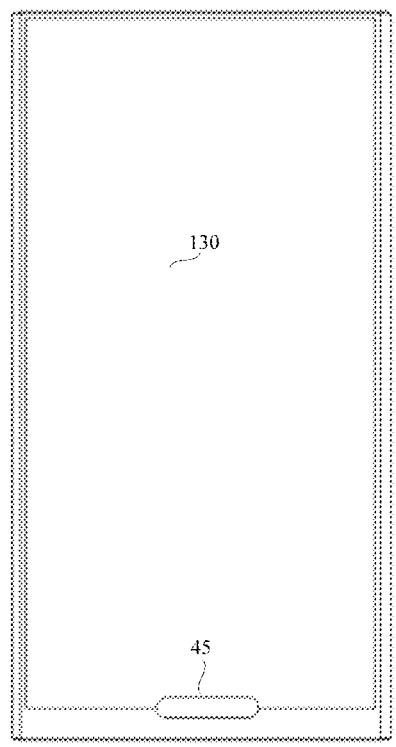
Figure 3F:
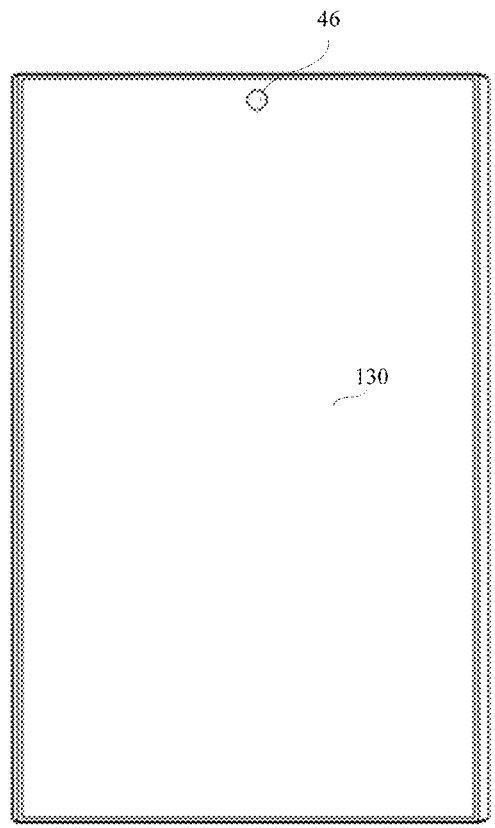

For example, the notch may be defined at one or more edges of the special-shaped screen, and the notch may be a semi-circular notch, a right-angled rectangular notch, a rounded rectangular notch, or an irregularly-shaped notch. In the embodiment as shown in FIG. 3C, the special-shaped screen may be a screen design that a semi-circular notch 43 is defined at a middle position of an upper edge of the touch screen 130. The space of the semi-circular notch is used to accommodate at least one component of the front panel such as a camera, a distance sensor (also known as a proximity sensor), an earpiece, and an ambient light brightness sensor. As shown in FIG. 3D, the special-shaped screen may be a screen design that a semi-circular notch 44 is defined at a middle position of a lower edge of the touch screen 130. The space of the semi-circular notch is used to accommodate at least one component of a physical button, a fingerprint sensor and a microphone. In the embodiment as shown in FIG. 3E, the special-shaped screen may be a screen design that a semi-elliptical notch 45 at a middle position of a lower edge of the touch screen 130, meanwhile, another semi-elliptical notch is formed in the front panel of the terminal 100, the two semi-elliptical notches enclose an elliptical area which is used to accommodate a physical button or a fingerprint recognition module. In the embodiment as shown in FIG. 3F, the special-shaped screen may be a screen design that at least one small hole 46 is defined at the upper half of the touch screen 130. The space of the small hole 46 is used to accommodate at least one component of the front panel such as a camera, a distance sensor, an earpiece, and an ambient light brightness sensor.

In addition, the person skilled in the art can understand that the structures of the terminal 100 shown in the above drawings are not limitations to the terminal 100. The terminal 100 may include more or less components than that illustrated in the drawings, or the terminal 100 may combine some components, or the terminal 100 may have different component arrangements. For example, the terminal 100 further includes components such as a radio frequency circuit, an input unit, a sensor, an audio circuit, a wireless fidelity (WiFi) module, a power supply, a bluetooth module and the like, and are not described herein again.

In the related art, icons included in a menu are predetermined when displayed corresponding to a call out command, such a display manner is not free enough. Based on this, the embodiments of the application provide an icon display method, device and terminal. In the embodiments of the application, when receiving a call out command, one or more icons corresponding to one or more application programs running in the foreground are acquired and then displayed. Compared to the related art in which several predetermined functional icons are invariably displayed in the menu, the solutions provided in the embodiments of the application realize that the icons, needed to be displayed, are dynamically adjusted according to different applications, so that the icons can be displayed more freely and the operating requirements can be met better.

Figure 4:
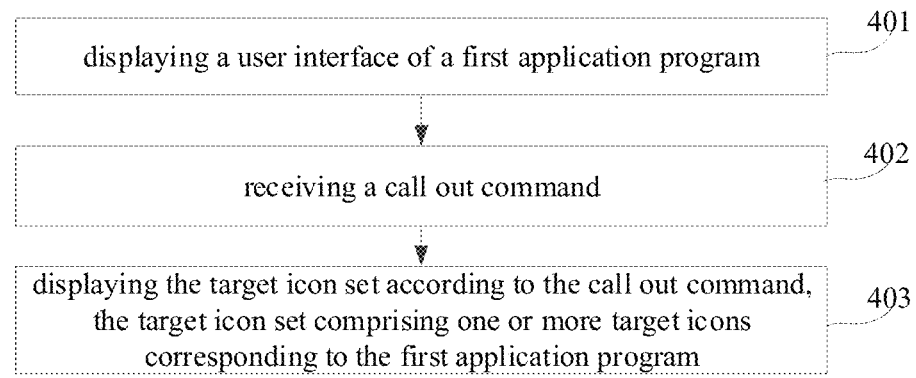
FIG. 4 is a schematic flowchart of an icon display method, according to an embodiment of the disclosure.

As illustrated in FIG. 4, it illustrates a schematic flowchart of an icon display method according to an exemplary embodiment of the disclosure. The method can be applied to the terminal described above. The method includes the follows.

Step 401, a user interface of a first application program is displayed.

The first application program is an application program running in the foreground. The first application program running in the foreground refers to that the first application program is run through a window. When the terminal runs the first application program in the foreground, the user interface of the first application program is displayed. The user interface of the first application program can be displayed in the entire display area of a screen of the terminal, or can be displayed in a part of the display area of the screen of the terminal. The user interface refers to a program interface of the first application program.

Step 402, a call out command is received.

The call out command is triggered by a user and is configured to call out/invoke a target icon set. Describe below are three implementation manners about the terminal receiving the call out command.

In a first possible implementation manner, when a first trigger signal corresponding to a special-shaped notch formed in the screen is received, it is determined that the call out command is received.

The special-shaped notch is configured to integrate at least one front panel component of a camera, a distance sensor, an earphone, and an ambient light sensor, to increase the screen-to-body ratio of the terminal. The special-shaped notch can be rounded, rounded rectangular, rectangular, oval, etc. The area of the special-shaped notch can be set according to the number and the size of the at least one front panel component to be integrated. The special-shaped notch can be defined in a peripheral region of the screen, also can be defined in a corner region of the screen. The area, the shape, and the location of the special-shaped notch are not limited in the embodiments of the application. The first trigger signal may be any one of a single-click signal, a double-click signal, a long press signal, and a slide signal. In this embodiment, the first trigger signal is a long press signal as an example for description.

In the embodiment, at least one of a pressure sensing assembly, a distance sensing assembly and a light sensing assembly is provided in the special-shaped notch. The pressure sensing assembly is configured to sense the pressure acted on the special-shaped notch. The pressure sensing assembly may be a pressure sensor. The distance sensing assembly is configured to sense a distance between an object (e.g., a human hand) and the special-shaped notch. The distance sensing assembly can be a distance sensor, a proximity sensor, and the like. The light sensing assembly is configured to sense ambient lights around the special-shaped notch. The light sensing assembly can be a light sensor, a camera, and the like.

When the special-shaped notch is provided with the pressure sensing assembly, the terminal obtains the first trigger signal corresponding to the special-shaped notch through the pressure sensing assembly provided in the special-shaped notch. When the special-shaped notch is provided with the distance sensing assembly, the terminal obtains the first trigger signal corresponding to the special-shaped notch through the distance sensing assembly provided in the special-shaped notch. When the special-shaped notch is provided with the light sensing assembly, the terminal obtains the first trigger signal corresponding to the special-shaped notch through the light sensing assembly provided in the special-shaped groove.

Figure 5:
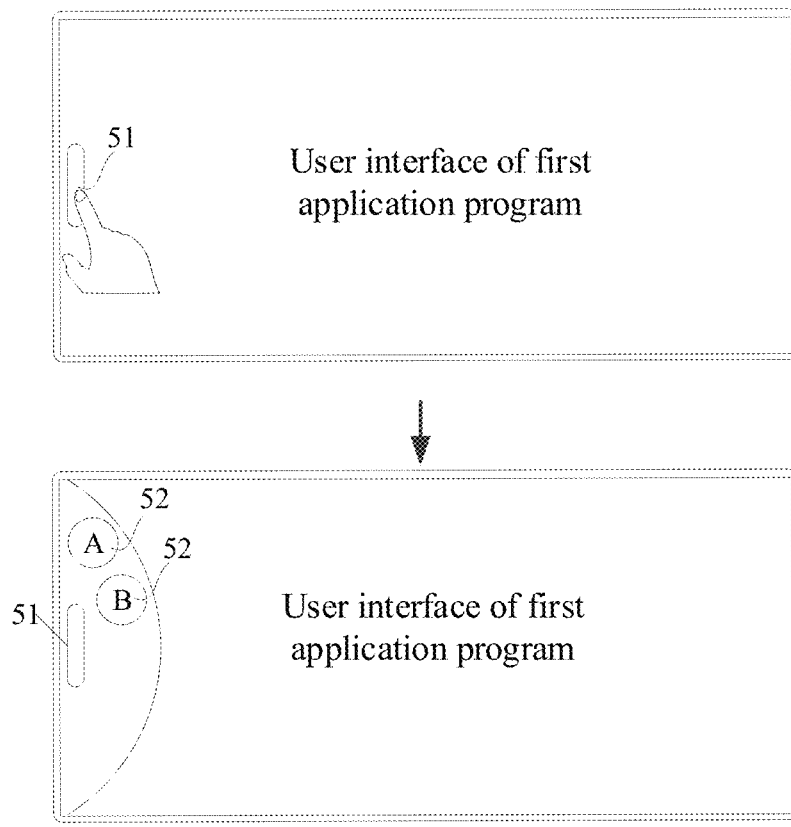
FIG. 5 is a schematic diagram showing a user interface of receiving a call out command, according to an embodiment of the disclosure.

FIG. 5 illustrates a schematic diagram of an interface for receiving a call out command, according to an embodiment of the application. When the user long presses a special-shaped notch 51, the terminal displays a target icon set according to the received call out command, and the target icon set includes one or more target icons 52 corresponding to the first application program.

In a second possible implementation manner, when a second trigger signal corresponding to a float displayed on the screen is received, it is determined the call out command is received.

The float is configured for triggering the display of the target icon set, which is usually displayed on the upper layer of the user interface of the first application program in a floating manner. The shape of the float may be round, rounded rectangular, oval, etc., which is not limited in the embodiments of the application. The float may always be displayed on the screen, or it may just be displayed on the screen when the first application program is started. The time when the float is displayed is not limited in the embodiments of the application.

Figure 6:
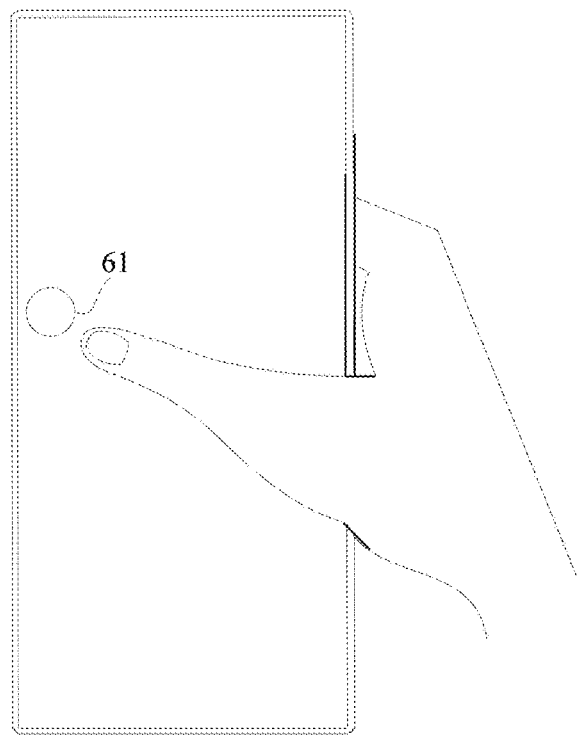
FIG. 6 is a schematic diagram showing a user interface of displaying a float, according to an embodiment of the disclosure.
Figure 7:
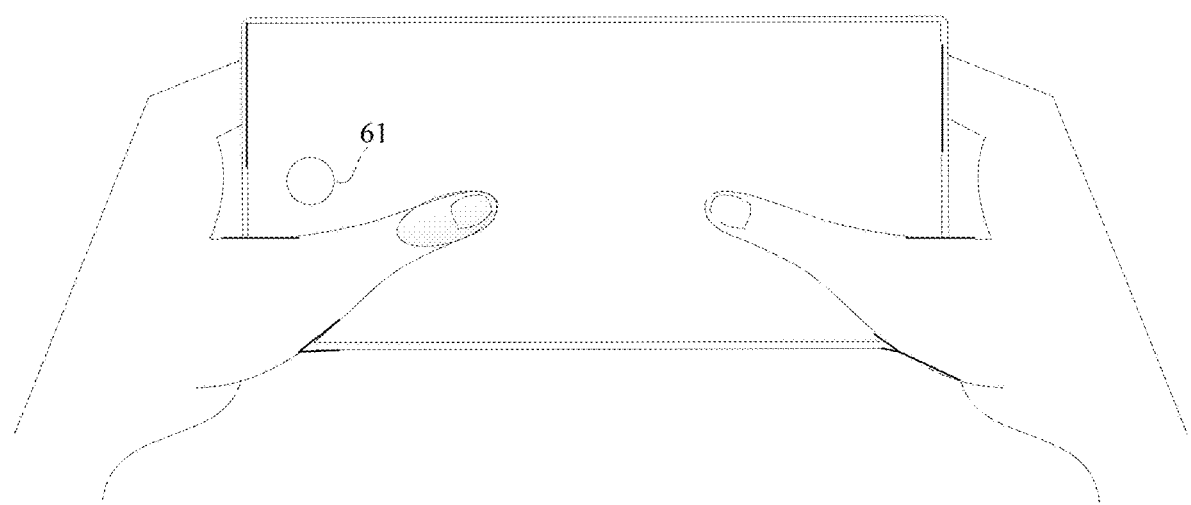
FIG. 7 is a schematic diagram showing a user interface of displaying a float, according to another embodiment of the disclosure.

In some embodiments of the application, the position where the float is displayed on the screen is determined according to an orientation of the terminal, and the terminal is held by the user with a holding posture which facilitates the user to operate the float more conveniently. With reference to FIG. 6, it illustrates a schematic diagram of an interface for displaying a float in an embodiment of the application. FIG. 6 shows the display position of a float 61 when the terminal is in a portrait orientation state. With reference to FIG. 7, it illustrates a schematic diagram of an interface for displaying a float in another embodiment of the application. FIG. 7 shows the display position of the float 61 when the terminal is in a landscape orientation state.

In addition, the position where the float is displayed on the screen can be changed. Specifically, when the terminal receives a fourth trigger signal corresponding to the float, the terminal changes the display position of the float according to the fourth trigger signal. The fourth trigger signal may be any one of a single-click signal, a double-click signal, a long press signal, and a swipe signal. The fourth trigger signal is different from the second trigger signal. For example, the fourth trigger signal is a drag signal, and the terminal displays the float at the position where the drag signal is disappeared.

The float can be hidden in the screen. Specifically, when the terminal receives a fifth trigger signal corresponding to the float, the terminal hides the float according to the fifth trigger signal. The fifth trigger signal can be any one of a single-click signal, a double-click signal, a long press signal, and a swipe signal. The fifth trigger signal is different from the second trigger signal and the fourth trigger signal. For example, the terminal receives a swipe signal corresponding to the float, wherein the swipe signal is a signal whose swipe direction is from the display position of the floating position to a peripheral region of the screen.

The second trigger signal may be any one of a single-click signal, a double-click signal, a long press signal, and a swipe signal. In the embodiment, the second trigger signal is a single-click signal, as an example for description.

Figure 8:
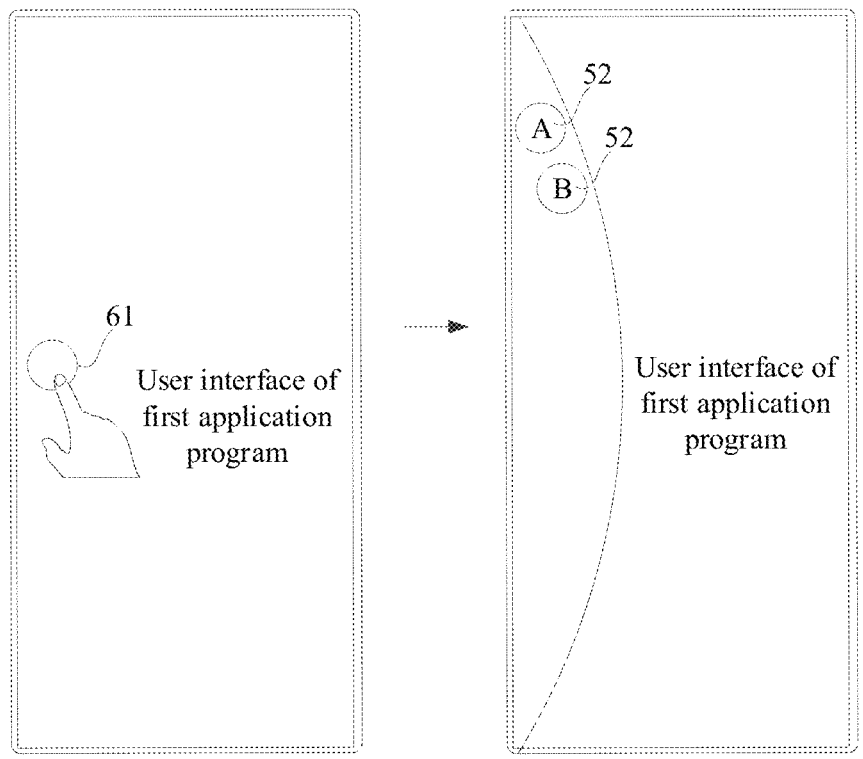
FIG. 8 is a schematic diagram showing a user interface of receiving a call out command, according to another embodiment of the disclosure.

FIG. 8 illustrates a schematic diagram of an interface for receiving a call out command, according to another embodiment of the application. When the user clicks the float 61, the terminal displays a target icon set according to the received call out command, and the target icon set includes one or more target icons 52 corresponding to the first application program.

FIG. 8 illustrates a schematic diagram of an interface for receiving a call out command in another embodiment of the application. When the user clicks the float 61, the terminal displays the target icon set according to the received call out command, and the target icon set includes the one or more target icons 52 corresponding to the first application program.

In the third possible implementation manner, when a third trigger signal corresponding to a side region of the screen is received, it is determined that the call out command is received.

The side region can be any area adjacent to a side of the screen, it can be the terminal default settings or user-defined settings. The third trigger signal may be any one of a single-click signal, a double-click signal, a long press signal, and a swipe signal. In this embodiment the third trigger signal is a swipe signal, as an example for description.

In some embodiments of the application, when the terminal is in the landscape orientation state, the terminal determines that the call out command is received when it receives a third trigger signal corresponding to a first side region of the screen. When the terminal is in the portrait orientation state, the terminal determines that the call out command is received when it receives a third trigger signal corresponding to a second side region of the screen. The first side region is different from the second side region.

Figure 9:
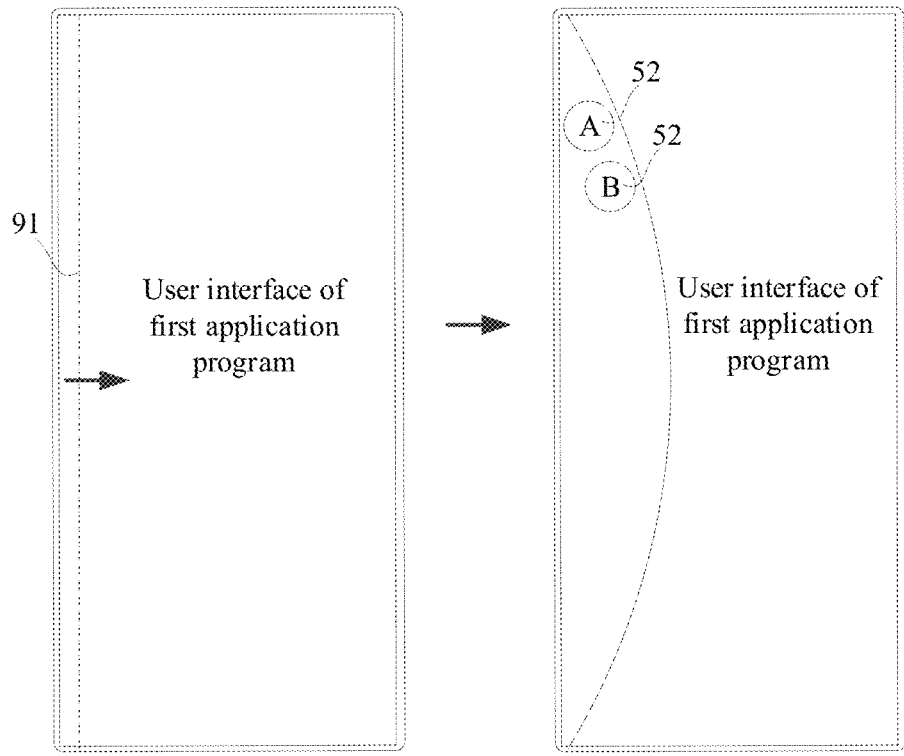
FIG. 9 is a schematic diagram showing a user interface of receiving a call out command, according to still another embodiment of the disclosure.
Figure 10:
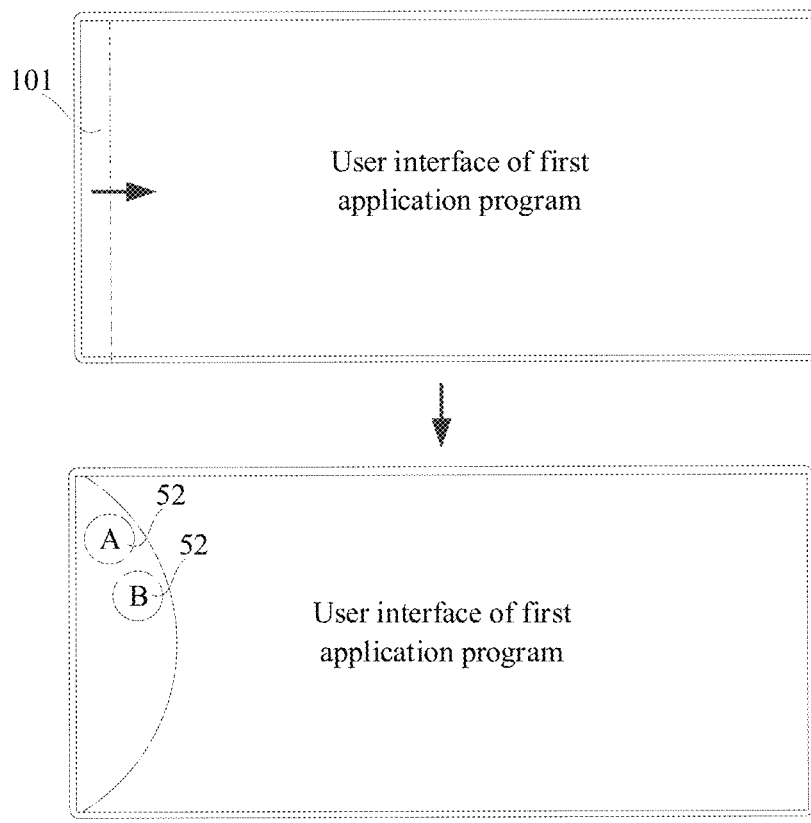
FIG. 10 is a schematic diagram showing a user interface of receiving a call out command, according to yet another embodiment of the disclosure.

FIG. 9 illustrates a schematic diagram of an interface for receiving a call out command, according to still another embodiment of the application. When the terminal is in the landscape orientation state, the user performs a swipe operation on a first side region 91, then the terminal displays a target icon set according to the received call out command, and the target icon set includes the one or more target icons 52 corresponding to the first application program. FIG. 10 illustrates a schematic diagram of an interface for receiving a call out command, according to yet another embodiment of the application. When the terminal is in the landscape orientation state, the user performs a swipe operation on a second side region 92, then the terminal displays a target icon set according to the received call out command, and the target icon set includes the one or more target icons 52 corresponding to the first application program.

Step 403, the target icon set is displayed according to the call out command.

The target icon set includes the one or more target icons corresponding to the first application program. The aforementioned target icon is an interactive icon that can quickly trigger a certain page, a certain function, or a certain application. The target icon corresponding to the first application program refers to an icon associated with the first application program. Optionally, the one or more target icons include one or more of a target content icon, a target function icon, and a target application icon. The target content icon is configured to trigger the display of content associated with the first application program. The target function icon is configured to trigger the terminal to perform a corresponding function, which can be provided by an operating system or a third-party application. The target program icon is configured to trigger the running of a corresponding application, which can be a native application in the operating system or a third-party application.

Figure 11:
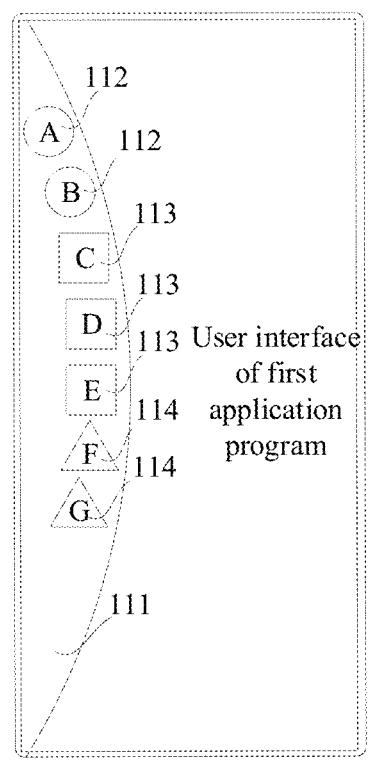
FIG. 11 is a schematic diagram showing a user interface of displaying icons, according to an embodiment of the disclosure.

Optionally, the terminal displays the target icons included in the target icon set along an arc in a designated region. The shape of the designated region may be user-defined settings or terminal default settings. Optionally, the designated region is an area enclosed by a straight side of the terminal and an arc, and the terminal arranges and displays the target icons included in the target icon set along the arc. FIG. 11 illustrates a schematic diagram showing the display of a target icon set according to an exemplary embodiment of the application. The terminal displays one or more target content icons 112, one or more target function icons 113, and one or more target application icons 114 in a designated region 111.

The position where the designated region is displayed on the screen can be defined by the user, or can be default settings of the terminal. Optionally, when a special-shaped notch is formed in the screen, the designated region refers to an area surrounding the aforementioned special-shaped notch. That is, the above-mentioned target icons are arranged and displayed along an arc around the special-shaped notch. Optionally, when the terminal receives the call out command through the second trigger signal corresponding to the float, the designated region may refer to an area surrounding the float. That is, the above-mentioned target icons are arranged and displayed along an arc around the float.

The number of target icons that can be accommodated in the designated region can be actually determined according to the area of each target icon and the area of the designated region. In addition, if the number of target icons determined to be displayed by the terminal exceeds the number of target icons that can be accommodated in the designated region, the terminal displays some of the target icons in the designated region and, when a sixth trigger signal corresponding to a designated region is received, the terminal cancels the display of one or more icons currently displayed in the menu and displays one or more icons of the others target icons that are not yet displayed. The sixth trigger signal may be a swipe signal whose direction is consistent with a arrangement direction of the target icons, or the sixth trigger signal can be a single-click signal, a double-click signal, or a long-press signal corresponding to a blank area in the designated region. The blank area refers to an area in the designated region that has no target icon displayed thereon, such as a gap between two adjacent target icons.

As described in the above embodiments, the target icons may include several types of icons such as target content icons, target function icons, and target application icons. In some embodiments of the application, the terminal may divide the designated region into a number of different sub-regions, and the different sub-regions are used to display different types of target icons, to facilitate the management of the target icons.

Optionally, the terminal uniformly divides the designated region according to the number of target icons that can be accommodated in the designated region. For example, the number of target icons that can be accommodated in the designated region is six, and the terminal divides the designated region into two sub-regions, and the number of target icons that can be accommodated in each region is three. Optionally, the terminal divides the designated region according to the type and the number of target icons desired to be displayed. For example, the number of target icons that can be accommodated in the designated region is six, and there are two content icons, three function icons, and one application icon desired to be displayed, then the designated region is divided into three sub-regions, in which a first sub-region can accommodate two target icons, a second sub-region can accommodate three target icons, and a third region can accommodate one target icon.

In a first possible implementation manner, the designated region is divided into two sub-regions, i.e., a first sub-region and a second sub-region. The number of target icons that can be accommodated in the first sub-region may be equal to or different from the number of target icons that can be accommodated in the second sub-region. Optionally, the first sub-region is configured to display one or more target content icons in the target icons, and the second sub-region is configured to display one or more target function icons in the target icons. Optionally, the first sub-region is configured to display one or more target content icons in the target icons, and the second area is used to display one or more target application icons in the target icons. Optionally, the first sub-region is configured to display one or more target function icons in the target icons, and the second sub-region is configured to display one or more target application icons in the target icons.

Figure 12:
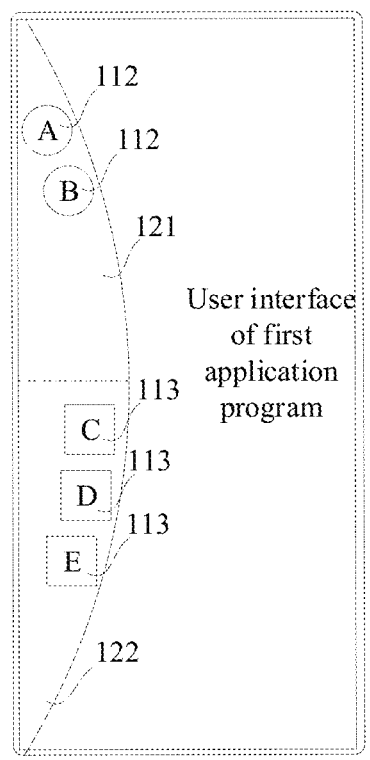
FIG. 12 is a schematic diagram showing a user interface of displaying icons, according to another embodiment of the disclosure.

FIG. 12 illustrates a schematic diagram showing the display of a target icon set according to another exemplary embodiment of the application. The terminal displays one or more target content icons 112 in a first sub-region 121 of a designated region, and displays one or more target function icons 113 in a second sub-region of the designated region.

In a second possible implementation manner, the designated region is divided into three sub-regions, i.e., a first sub-region, a second sub-region, and a third region. The number of target icons that can be accommodated in the first sub-region, the number of target icons that can be accommodated in the second sub-region, and the number of target icons that can be accommodated in the third region can be the same or can be different. Optionally, the first sub-region is configured to display one or more target content icons in the target icons, the second sub-region is configured to display one or more target function icons in the target icons, and the third region is configured to display one or more target application icons in the target icons.

Figure 13:
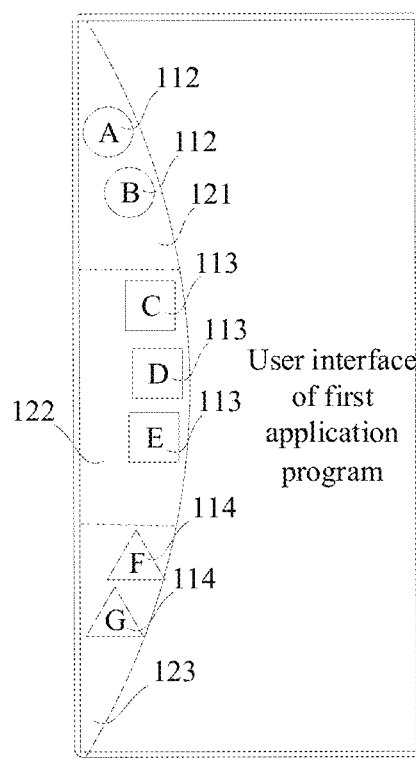
FIG. 13 is a schematic diagram showing a user interface of displaying icons, according to still another embodiment of the disclosure.

FIG. 13 illustrates a schematic diagram showing the display of a target icon set according to still another exemplary embodiment of the application. The terminal displays one or more target content icons 112 in a first sub-region 121 of a designated region, displays one or more target function icons 113 in a second sub-region 122 of the designated region, and displays one or more target application icons 114 in a third region 131 of the designated region.

In addition, the terminal can display a specified type of icons with a highlighted display manner. The highlighted display manner is configured to remind that there are icons of the specific type, and the highlighted manner may include a flashing display manner, a brightness enhancement manner, and so on. The specified type of icons may be any type of the target application icons, the target function icons, and the target content icons. In the embodiments of the application, the target content icons are taken as the specified type of icons, as an example for explanation. Further, when a special-shaped notch is formed in the screen, other ways can be used to remind the existence of the specified type of icons, for example, by making the special-shaped notch emit neon light, and by making the special-shaped notch flash and glow. Optionally, the terminal uses the highlighted display manner to display the specified type of icons within a preset time period. The preset time period may be a time period starting from the display of the specified type of icons and having a duration of a preset threshold value. The preset time period may be the terminal default settings or the user-defined settings. Through the above way, it is possible to prevent the terminal from continuously using the highlighted display manner to display the specified type of icons, thereby effectively reducing the power consumption of the terminal.

In summary, the technical solutions provided by the embodiments of the application obtains and displays one or more icons corresponding to one or more application programs running in the foreground, when receiving a call out command. Compared to the related art in which several predetermined functional icons are invariably displayed in the menu, the technical solutions provided in the embodiments of the application realize that the icons, needed to be displayed, are dynamically adjusted according to different applications, so that the icons can be displayed more freely and the operating requirements can be met better.

As mentioned in the above embodiments, the terminal displays the target icon set, including the one or more target icons corresponding to the application program running in the foreground (i.e., the first application program), the one or more above-mentioned target icons are determined in real time by the terminal after receiving the call out command, the determining method of the target icons are described as follows.

In an optional embodiment provided based on the embodiment as shown in FIG. 4, before the step 403, the icon display method further includes the following steps.

Step 501, characteristic information of the first application program is obtained.

The characteristic information of the first application program includes any one or more of the following information: content information, type information, first correlation information, and second correlation information.

The content information is used to indicate the display content in a user interface of the first application program. Different application programs correspond to different content information. In addition, different running stages of the same application program correspond to different content information. When the first application program is a shooting application, the content information includes shooting subject information and/or shooting scene information. When the first application program is a game application, the content information includes any one or more of the following: running stage information of the game application, level information of the game application, map information of the game application, and virtual role configuration information of the game application. When the first application program is a video application, the content information includes identification information of a currently played video, such as the name of the currently played video. When the first application is a reading application, the content information includes identification information of the currently read e-book, such as the name of the e-book.

The type information is used to indicate the type of the first application program. The type of the first application program include but is not limited to: game type, shooting type, video type, and reading type. Optionally, the terminal stores a first mapping relationship between different applications and different type information. After determining the first application program, the terminal searches for the first mapping relationship to obtain the type information of the first application program.

The first correlation information is used to indicate a correlation between one or more function icons and the first application program. Alternatively, the above correlation can be measured by the usage frequency of the function icon in the running process of the first application program. The above correlation is positively correlated with the usage frequency of function icon in the running process of the first application program. In other words, the greater the usage frequency, the larger the correlation of the function icon and the first application program; the lower the usage frequency, the smaller the correlation. In addition, the usage frequency of the function icon during the running of the first application program can be actually set according to the usage of its functions during the historical running process. The historical running process may be the running process of the first application program in a recent period of time. The recent period of time may be the last week, the last month, or the last six months, which is not limited in the embodiments of the application. The usage of its functions includes the executing frequency and the executing number of each function. Optionally, the terminal determines the usage frequency as a ratio of the number of times that a certain function is executed during the running of the first application program to the number of times that the first application program runs.

The second correlation information is used to indicate a correlation between one or more application icons and the first application program. Alternatively, the above correlation can be evaluated by the type information of a particular application program. If the type information of the particular application program is the same as that of the first application program, it is determined that the correlation of the particular program information and the first application program is relatively large. If the type information of the particular application program is different from that of the first application program, it is determined that the correlation of the particular program information and the first application program is relatively small. In another possible implementation manner, the aforementioned correlation may be measured by the probability that the particular application program and the first application program run simultaneously. The correlation is positively correlated with the probability that the particular application program and the first application program run simultaneously. That is, the greater the probability that the particular application program and the first application program run at the same time, the greater the correlation between the application icon and the first application program; the lower the probability, the smaller the correlation. Further, the probability of running simultaneously with the first application program, can be actually set according to the program running situation of the first application program in the historical running process. The historical running process may be a running process of the first application program in a recent period of time. The recent period of time may be the last week, the last month, or the last six months, which is not limited in the embodiments of the application. The program running situation includes the running frequency and the running time of each application program that runs simultaneously with the first application program. Optionally, the terminal determines the probability as a ratio of the number of times that the particular application program and the first application program run simultaneously to the number of times that the first application program runs.

Step 502, one or more target icons corresponding to the first application program are determined, according to characteristic information of the first application program.

In the embodiment of the application, the one or more target icons corresponding to the first application program are determined in real time according to the acquired characteristic information. The specific implementation manners of determining the target icons are described below with several examples.

In a first example, when the characteristic information of the first application program includes content information of the first application program, the one or more target icons include one or more target content icons. Processes of implementing this example are as follows.

Step 502a, one or more pieces of recommended content corresponding to the content information of the first application program is acquired.

The recommended content related to the first application program refers to the content that a similarity between its included key information and the content information is greater than a similarity threshold. The similarity threshold can be set according to practical requirements and is not limited in the embodiments of the application. The key information can be keywords extracted from the title or the text of said content.

In the embodiments of the application, the step 502a may specifically include the following sub-steps.

Sub-step 502a1, a content acquisition request is sent to a server.

The content acquisition request is configured to request to acquire the recommended content related to the first application program. The content acquisition request may carry an identity of the terminal, an identity of the first application program, and the content information of the first application program. As an example, the terminal sends the content acquisition request when the first application program starts running. As another example, the terminal sends the content acquisition request when receiving the call out command.

Correspondingly, the server receives the content acquisition request sent from the terminal, and acquires, according to the content information, the recommended content related to the first application program. Specifically, the server determines multiple pieces of content corresponding to the first application program according to the identity of the first application program, calculates similarities between the content information of the first application program and key information of every piece of content that previously determined, and then determines one or more pieces of content, whose similarities greater than the similarity threshold, to be the one or more pieces of recommended content related to the first application program. In addition, the server may also determine the pieces of content having the top n correlation as the one or more pieces of recommended content related to the first application program, where n is determined according to the number of one or more pieces of recommended content practically required by the terminal.

After determining the recommended content related to the first application program, the server feeds back the recommended content to the terminal.

Sub-step 502*a*2, the terminal receives the recommended content sent from the server.

In other possible implementation manners, the terminal may also obtain the recommended content by itself, so as to improve the efficiency of obtaining the recommended content. The way that the terminal obtains the recommended content, can refer to the way that the server obtains the recommended content as described above, and it is not repeated here again.

Different first application programs correspond to different recommended content. When the first application program is a shooting application, the recommended content may include one or more of the following: encyclopedia information of the subject, news of the subject, news of the shooting scene, and the like. When the first application program is a game application, the recommended content may include one or more of the following: strategy information, event information, and news information. When the first application program is a video application, the recommended content may include one or more of the following: review information, encyclopedia information, tidbits information, recommended video information, and creator information, wherein these information may be about the video currently played in the video application.

Step 502*b*, one or more target content icons corresponding to the first application program are determined, according to the one or more pieces of recommended content.

The target content icon is configured to trigger the display of the recommended content. In a possible implementation, the terminal stores a correspondence between every target content icon and every type of the recommended content. After obtaining the one or more pieces of the recommended content, the terminal first determines the type of every piece of the recommended content, and then searches, according to the type of every piece of the recommended content, said correspondence to obtain icons of corresponding content. When the type of the recommended content is strategy, a portion of the word "strategy" is displayed in the content icon; when the type of the recommended content is encyclopedia, a portion of the word "encyclopedia" is displayed in the content icon; when the type of the recommended content is news, a portion of the word "news" is displayed in the content icon, and so on. In another possible implementation manner, the terminal generates one or more corresponding content icons according to the one or more pieces of the recommended content. For example, the terminal determines a thumbnail or a preview image of the one or more pieces of the recommended content as the one or more target content icons corresponding to the recommended content.

Since the recommended content may be relatively long, it should be avoided that the user interface and other icons in the menu are blocked when the recommended content is directly displayed. In the embodiments of the application, the one or more target content icons corresponding to the recommended content are displayed first, and then the corresponding recommended content is displayed when a trigger signal corresponding to the one or more target content icons has been received.

In a second example, when the characteristic information of the first application program includes the type information, the one or more target icons include one or more target function icons. Processes of implementing this example are as follows.

Step 502*c*, one or more function icons, corresponding to the type information of the first application program, are determined as the one or more target function icons.

Optionally, the terminal stores a second mapping relationship between different functional icons and different type information. When acquiring the type information of the first application program, the terminal searches for the second mapping relationship to obtain one or more function icons corresponding to the first application program, such obtained one or more function icons corresponding to the type information of the first application program are determined as the one or more target function icons.

The function icons corresponding to different type information are described below.

When the type information of the first application program is a game application, the function icons corresponding to the type information of the first application program includes one or more of the following: an on-hook icon, a virtual backpack icon, a virtual skill icon, a mute icon, a background cleaning icon, a screenshot icon, and a screen recording icon. The on-hook icon is configured to trigger the starting or closing of an on-hook operation corresponding to the first application program. The virtual backpack icon is configured to trigger the display of virtual items in a virtual backpack, and the virtual skill icon is configured to trigger the use of a virtual skill, or the viewing of damage information and consumption information of the virtual skill. The mute icon is configured to trigger the opening or closing of sound effects of the first application program. The background cleaning icon is configured to trigger the closing of any application running in the background to improve the running effect of the first application program. The screenshot icon is configured to trigger a screenshot of all or part of the display area of the screen. The screen recording icon is configured to trigger a recording of all or part of the display area of the screen.

When the type information of the first application program is a video application, the function icons corresponding to the type information of the first application program includes one or more of the following: a play icon, a pause icon, a volume adjustment icon, and a brightness adjustment icon, a screenshot icon, and a screen recording icon. The play icon is configured to trigger the play of a video. The pause icon is configured to trigger the pause of the video. The volume adjustment icon is configured to adjust the volume of the video being played. The brightness adjustment icon is configured to adjust the brightness of the video being played.

When the first application program is a shooting application, the function icons corresponding to the type information of the first application program includes one or more of the following: a shooting setting icon, a filter selection icon, a flash icon, and a time-lapse shooting icon. The shooting setting icon is configured to trigger the setting of one or more shooting parameters, and the filter selection icon is configured to select a filter used for processing captured images. The flash icon is configured to trigger a flash function on or off. The time-lapse shooting icon is configured to trigger a time-lapse shooting function on or off, and to set a duration of a time-lapse.

When the first application is a reading application, the function icons corresponding to the type information of the first application program includes one or more of the following: a reading setting icon, a directory icon, a mode switching icon, a search icon, and a bookmark icon. The reading setting icon is configured to set one or more reading parameters. The directory icon is configured to trigger a jump to a directory of the e-book currently being read. The mode switch icon is configured to trigger the switching of reading modes. The search icon is configured to trigger a search for the content input by the user in the e-book currently being read. The bookmark icon is configured to trigger the display of a bookmark set by the user for the e-book currently being read, and to set the bookmark at the current reading position.

In a third example, when the characteristic information of the first application program includes the first correlation information, the one or more target icons include one or more target function icons. Processes of implementing this example are as follows.

Step 502d, according to the first correlation information, one or more function icons whose correlation with the first application program meet a first preset condition are determined as one or more target function icons.

In a first possible implementation manner, the first preset condition refers to that a correlation between the function icon and the first application program is greater than a first correlation threshold. That is, the terminal determines one or more function icons whose correlation with the first application program are greater than the first correlation threshold as the one or more target function icons. The larger the number of function icons desired to be displayed, the smaller the first correlation threshold; the smaller the number of function icons desired to be displayed, the larger the first correlation threshold.

When, the usage frequency of the function icon in the running process of the first application program, is used to measure the correlation between the function icon and the first application program, the terminal determines one or more function icons, whose usage frequency in the running process of the first application program is greater than a frequency threshold, as the one or more target function icons. The frequency threshold may be set according to practical requirements, and it is not limited in the embodiments of the application.

In a second possible implementation manner, the terminal sorts the function icons in descending order of the correlation with the first application program, and the first preset condition refers to that the correlation with the first application program is ranked in the top n, where n is a positive integer and can be practically determined according to the number of target function icons needed to be displayed. For example, the number of target function icons needed to be displayed is 2, the terminal determines the function icons with the top two correlation as the target function icons.

When, the usage frequency of the function icon in the running process of the first application program, is used to measure the correlation between the function icon and the first application program, the terminal sorts the function icons in descending order of the usage frequency, and determines the function icons whose usage frequency are top n, as the target function icons.

In a fourth example, when the characteristic information of the first application program includes the second correlation information, the one or more target icons include one or more target application icons. Processes of implementing this example are as follows.

Step 502e, according to the second correlation information, one or more application icons whose correlation with the first application program meets a second preset condition, are determined as one or more target application icons.

In a first possible implementation manner, the second preset condition refers to that the correlation between the application icon and the first application program is greater than a second correlation threshold. That is, the terminal determines one or more application icons whose correlation with the first application program are greater than the second correlation threshold as the one or more target application icons. The second correlation threshold may be determined according to the number of application icons desired to be displayed. The larger the number of application icons desired to be displayed, the smaller the second correlation threshold; the smaller the number of application icons desired to be displayed, the larger the second correlation threshold.

The second correlation threshold can be the same as or different from the first correlation threshold.

When the probability that a particular application and the first application program run simultaneously, is used to measure the correlation between a particular application icon of the particular application and the first application program, the terminal determines, one or more application icons having the probability of running simultaneously with the first application program is greater than a probability threshold, as one or more target application icons. The probability threshold can be set according to practical requirements and is not limited in the embodiments of the application.

In a second possible implementation manner, the terminal sorts the application icons in descending order of the correlation between the application icons and the first application program, and the second preset condition refers to that the correlation with the first application program is ranked at top m, where m is a positive integer and may be practically determined according to the number of target application icons needed to be displayed. For example, if the number of target application icons that needed to be displayed is 2, the terminal determines two application icons, having the top two correlation with the first application program, as the target application icons.

When the probability that a particular application and the first application program run simultaneously, is used to measure the correlation between a particular application icon of the particular application and the first application program, the terminal sorts the application icons, according to a descending order of the probability of each application icon running simultaneously with the first application program, and determines the application icons with the top m probability as the target application icons.

Different first application program corresponds to different application icons correlated thereto. When the first program application is a shopping application, the application icon correlated to the first application program is a payment application icon; when the first application program is a shooting application, the application icon correlated to the first application program is an album application icon; when the first application program is a travel application, the application icon correlated to the first application program is a map application icon.

In summary, the technical solutions provided by the embodiments of the application enable the user to quickly view the recommended content related to the first application program by displaying one or more content icons corresponding to the content information of the first application program in the designated region. The user is further enabled to quickly perform functions related to the first application program, by displaying, in the designated region, the function icons determined according to the type information or the correlation information of the first application program. The user is further enabled to quickly open applications related to the first application program, by displaying, in the designated region, application icons determined according to the correlation information of the first application program.

In optional embodiments provided based on the embodiment shown in FIG. 4, after the terminal displays every target icon in the target icon set, the user can perform a corresponding operation on any icon.

When the target icons include one or more target content icon, the method may also include the following steps after the step 403.

Step 601, a selection signal corresponding to any target content icon is obtained.

When the user needs to view the recommended content corresponding to the content information of the first application program, any target content icon can be selected and triggered. The selection signal can be any one of a single-click signal, a double-click signal, a long press signal and a swipe signal. In the embodiment of the application, the selection signal is a single-click signal, as an example for description.

Step 602, the recommended content corresponding to the selected target content icon is displayed.

After receiving the selection signal, the terminal displays the recommended content corresponding to the selected target content icon according to the selection signal. Optionally, the terminal displays a first floating window on an upper layer of a first user interface, and the first floating window is configured to display the recommended content corresponding to the selected target content icon. Alternatively, the terminal displays the recommended content corresponding to the selected target content icon in a portion of the display area of the screen.

When the target icons include one or more target function icons, the method may also include the following steps after the step 403.

Step 603, a first selection signal corresponding to any target function icon is obtained.

The target function icon can be any function icon selected by the user. The first selection signal can be any one of a single-click signal, a double-click signal, a long press signal and a swipe signal. In the embodiment of the application, the selection signal is a single-click signal, as an example for description.

Step 604, one or more function corresponding to the selected target function icon are performed.

When the user desires to perform a particular function related with the first application program, a corresponding one of the target function icons can be selected and triggered.

When the target function icons include one or more target application icons, the method the method may also include the following steps after the step 403.

Step 605, a second selection signal corresponding to any target application function icon is obtained.

The target application icon can be any application icon selected by the user. The second selection signal can be any one of a single-click signal, a double-click signal, a long press signal and a swipe signal.

Step 606, a user interface of the selected target application icon is displayed.

Different second selection signal corresponds to different manner that the terminal displays the user interface of the selected target application icon. For instance, when the second selection signal is a single-click signal, the terminal closes the user interface of the first application program, and displays the user interface of the selected target application icon. When the second selection signal is a double-click signal, the terminal displays a second floating window, and displays the user interface of the selected target application icon in the second floating window. When the second selection signal is a drag signal, the terminal displays the user interface of the selected target application icon and the user interface of the first application program in a split-display manner.

Figure 14:
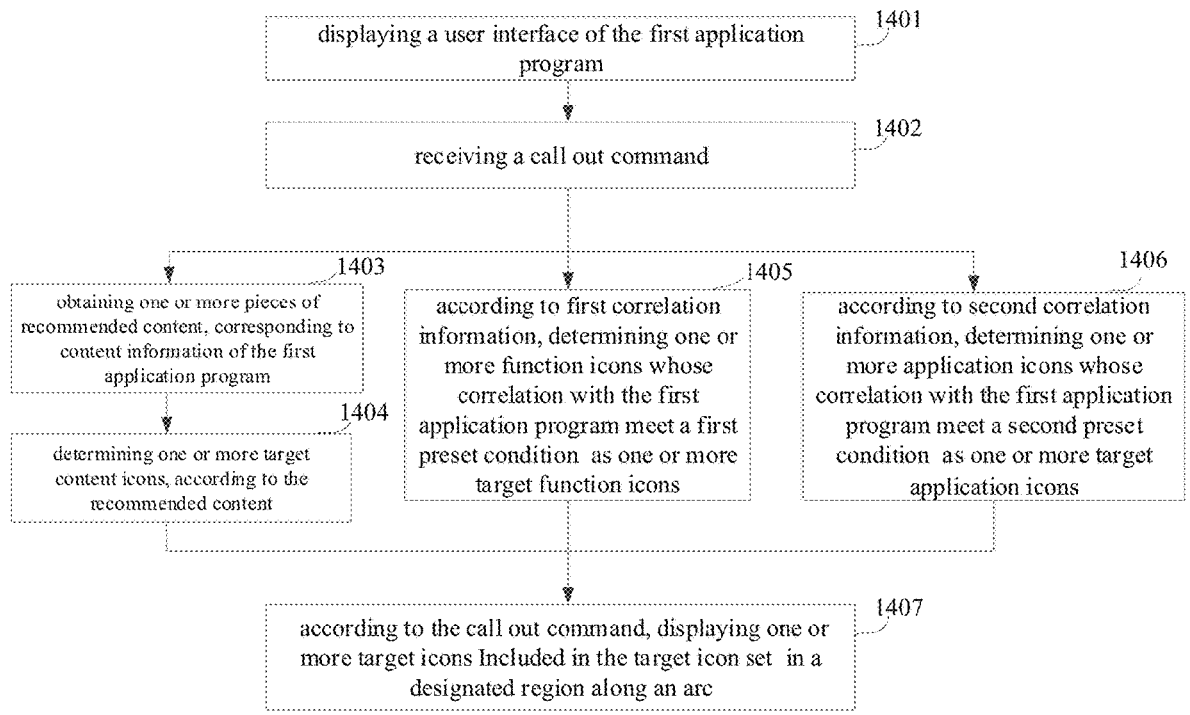
FIG. 14 is a schematic flowchart of an icon display method, according to another embodiment of the disclosure.

FIG. 14 illustrates an icon display method according to another embodiment of the application. The method can be applied to the terminal described in the above embodiments. In this embodiment, one or more target icons corresponding to a first application program include one or more target content icons, one or more target function icons, and one or more target application icons. The method includes the following steps.

Step 1401, a user interface of the first application program is displayed.

Step 1402, a call out command is received.

Step 1403, one or more pieces of recommended content, corresponding to content information of the first application program, are obtained.

Step 1404, one or more target content icons are determined according to the recommended content.

Step 1405, according to first correlation information, one or more function icons whose correlation with the first application program meet a first preset condition are determined as one or more target function icons.

Step 1406, according to second correlation information, one or more application icons whose correlation with the first application program meet a second preset condition are determined as one or more target application icons.

The above steps 1403 to 1404 are processes of obtaining the target content icon corresponding to the first application program, the above step 1405 is the process of obtaining the target function icon corresponding to the first application program, and the above step 1406 is the process of obtaining the target application icon corresponding to the first application program. The terminal may perform some or all above steps according to the type of icons that needed to be acquired, which is not limited in the embodiments of the application.

Step 1407, according to the call out command, one or more target icons included in the target icon set are displayed in a designated region along an arc.

The following are device embodiments of this application, which are configured for implementing the method embodiments of this application. For details not disclosed in the device embodiments, please refer to the method embodiments as described above.

Figure 15:
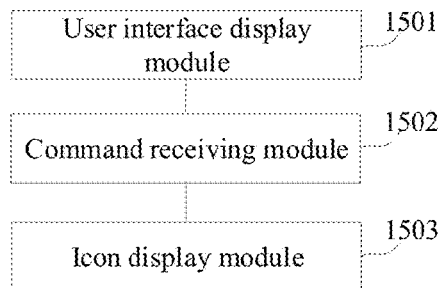
FIG. 15 is a schematic block diagram of an icon display device, according to an embodiment of the disclosure.

FIG. 15 illustrates a block diagram of an icon display device provided by an embodiment of the application. The icon display device has the function of realizing the above icon display method, wherein the function can be realized by hardware, or by hardware executing corresponding software. The device may include an interface display module 1501, a command receiving module 1502, and an icon display module 1503.

The interface display module 1501 is configured to display a user interface of a first application program.

The command receiving module 1502 is configured to receive a call out command, and the call out command is configured for calling out a target icon set.

The icon display module 1503 is configured to display the target icon set according to the call out command, and the target icon set includes one or more target icons corresponding to the first application program.

In summary, the technical solutions provided by the embodiment of the application obtains and displays one or more icons corresponding to one or more application programs running in the foreground, when receiving the call out command. Compared to the related art in which several predetermined functional icons are invariably displayed in the menu, the technical solutions provided in the embodiment of the application realize that the icons, needed to be displayed, are dynamically adjusted based on different running applications, so that the icons can be displayed more freely and the operating requirements can be met better.

In an optional embodiment provided based on the embodiment shown in FIG. 15, the icon display device further includes an information acquiring module and an icon determining module.

The information acquiring module is configured to acquire characteristic information of the first application program.

The icon determining module is configured to determine the one or more target icons, according to the characteristic information of the first application program.

Optionally, the characteristic information of the first application program includes any one or more of the following information of the first application program: content information, type information, first correlation information, and second correlation information. The content information is configured to indicate the display content in the user interface of the first application program. The type information is configured to indicate the type of the first application information. The first correlation information is configured to indicate the correlation of the first application program and one or more function icons. The second correlation information is configured to indicate the correlation of the first application program and one or more application icons.

Optionally, when the characteristic information of the first application program includes the content information of the first application program, the target icons include one or more target content icons, and the icon determining module is configured to: acquire one or more pieces of recommended content corresponding to the content information of the first application program; and determine the one or more target content icons according to the acquired recommended content.

Optionally, the device further includes a signal acquiring module and a content display module (not shown in the figure).

The signal acquiring module is configured to acquire a selection signal corresponding to any one of the target content icons.

The content display module is configured to display a particular piece of the recommended content corresponding to the selected target content icon.

When the first application program is a shooting application, the recommended content may include one or more of the following: encyclopedia information of the subject, news of the subject, news of the shooting scene, and the like. When the first application program is a game application, the recommended content may include one or more of the following: strategy information, event information, and news information. When the first application program is a video application, the recommended content may include one or more of the following: review information, encyclopedia information, tidbits information, recommended video information, and creator information.

Optionally, when the characteristic information of the first application program includes the type information, the target icons include one or more target function icons; and the icon determining module is configured to determine the function icons which are corresponding to the type information of the first application program as the one or more target function icons.

Optionally, when the type information of the first application program is a game application, the function icons corresponding to the type information of the first application program includes one or more of the following: an on-hook icon, a virtual backpack icon, a virtual skill icon, a mute icon, a background cleaning icon, a screenshot icon, and a screen recording icon. When the type information of the first application program is a video application, the function icons corresponding to the type information of the first application program includes one or more of the following: a play icon, a pause icon, a volume adjustment icon, and a brightness adjustment icon, a screenshot icon, and a screen recording icon. When the first application program is a shooting application, the function icons corresponding to the type information of the first application program includes one or more of the following: a shooting setting icon, a filter selection icon, a flash icon, and a time-lapse shooting icon. When the first application is a reading application, the function icons corresponding to the type information of the first application program includes one or more of the following: a reading setting icon, a directory icon, a mode switching icon, a search icon, and a bookmark icon.

Optionally, when the characteristic information includes the first correlation information, the target icons include one or more target function icons, and the icon determining module is configured to determine, according to the first correlation information, one or more function icons whose correlation with the first application program meets a first preset condition as the one or more target function icons.

Optionally, when the characteristic information includes the second correlation information, the target icons include one or more target application icons, and the icon determining module is configured to determine, according to the second correlation information, one or more function icons whose correlation with the first application program meets a second preset condition as the one or more target function icons.

In another optional embodiment provided based on the embodiment shown in FIG. 15, the icon display module 1503 is configured to display target icons in the target icon set along an arc in the designated region.

Optionally, the designated region includes a first sub-region and a second sub-region, the first sub-region is configured to display one or more target content icons included in the target icons, and the second sub-region is configured to display one or more target function icons included in the target icons. Alternatively, the first sub-region is configured to display one or more target content icons included in the target icons, and the second sub-region is configured to display one or more target application icons included in the target icons. Alternatively, the first sub-region is configured to display one or more target function icons included in the target icons, and the second sub-region is configured to display one or more target application icons included in the target icons.

Optionally, the designated region includes a first sub-region, a second sub-region and a third region. The first sub-region is configured to display one or more target content icons included in the target icons, the second sub-region is configured to display one or more target function icons included in the target icons, and the third region is configured to display one or more target application icons included in the target icons.

Optionally, there is a special-shaped notch formed in a screen, and the target icons are displayed along an arc and surrounds the special-shaped notch.

In still another optional embodiment provided based on the embodiment shown in FIG. 15, the command receiving module 1502 is configured to receive the call out command, when receiving a first trigger signal performed on the special-shaped notch, or when receiving a second trigger signal performed on a float displayed on the screen, or when receiving a third trigger signal performed on a side region of the screen.

It should be noted that the functions implemented by the device provided in the foregoing embodiments are described by taking an allocation manner of the foregoing functional modules as an example. In practical, the above-mentioned function can be executed by different functional modules according to practical requirements, that is, the internal structure of the device can be divided into different functional modules to execute all or part of the functions described above. In addition, the device and method embodiments provided in the above embodiments belong to a same concept, and the specific implementation processes are detailed in the method embodiments, which will not be repeated here.

In an exemplary embodiment, a computer-readable storage medium is also provided. There is a computer program stored in the computer-readable storage medium. The computer program is loaded and executed by a processor of a terminal to perform the steps of the foregoing method embodiments.

In the exemplary embodiment, a computer program product is also provided. When the computer program product is executed, it is configured to implement the functions of each step in the foregoing method embodiments.

It should be understood that the "plurality" mentioned herein refers to two or more. "And/or" indicates an association relationship of associated objects, including three relationships. For example, A and/or B may means that: just A, both A and B, and just B. The character "/" generally indicates that the associated objects are in an "or" relationship.

The above are only preferred embodiments of the present disclosure, and are not intended to limit the present disclosure. Any modification, equivalation, or improvement made within the spirit and principle of the present application shall be included in the protection of the present disclosure within range.

What is claimed is:

1. An icon display method, applied to a terminal, a special-shaped notch being provided in a screen of the terminal, the method comprising:
   displaying a user interface of a first application program;
   receiving a call out command in response to sensing a click operation or press operation performed on the special-shaped notch, the call out command being configured to request to call out one or more target application icons corresponding to the first application program;
   in response to receiving the call out command, determining at least one application icon as the one or more target application icons according to correlation information of the first application program, wherein the correlation information indicates a correlation between one or more application icons and the first application program, and the determined at least one application icon corresponds to one or more applications each having a probability of running simultaneously with the first application program greater than a probability threshold;
   displaying the one or more target application icons;
   receiving a selection signal acting on one of the displayed one or more target application icons; and
   displaying a user interface of an application corresponding to the selected target application icon simultaneously with the user interface of the first application program, in such a manner that the user interface of the application corresponding to the selected target application icon and the user interface of the first application program are presented on the screen in different display modes depending on a form of the selection signal, comprising:
      displaying the user interface of the application corresponding to the selected target application icon and the user interface of the first application program on the screen in a split-screen display mode, in response to detecting that the selection signal is a drag signal; and
      displaying the user interface of the application corresponding to the selected target application icon in a floating window presented on the user interface of the first application program, in response to detecting that the selection signal is only a double-click signal;
   wherein the one or more target application icons and a float are displayed on a screen, and receiving the call out command further comprises:
      determining the call out command is received when receiving a second trigger signal performed on the float, wherein a position where the float is displayed on the screen is determined according to an orientation of the terminal; and
      hiding the float according to a fifth trigger signal performed on the float, the fifth trigger signal being different from the second trigger signal.

2. The method as claimed in claim 1, further comprising:
   acquiring content information, type information, and further correlation information of the first application program;
   wherein the content information is configured to indicate display content in the user interface of the first application program, the type information is configured to indicate the type of the first application information, and the further correlation information is configured to indicate the correlation of the first application program and any function icon.

3. The method as claimed in claim 2, wherein the call out command is further configured to request to call out one or more target content icons corresponding to the first application program, and the method further comprises:
   acquiring one or more pieces of recommended content corresponding to the content information of the first application program, wherein a similarity between key information included in the recommended content and the content information is greater than a similarity threshold, and different running stages of the first application program correspond to different content information;
   determining the one or more target content icons according to a type of each piece of the acquired recommended content; and
   displaying the one or more target content icons.

4. The method as claimed in claim 3, after displaying the one or more target content icons, the method further comprising:
   acquiring a selection signal corresponding to any target content icon; and
   displaying a piece of recommended content corresponding to the selected target content icon.

5. The method as claimed in claim 3, when the first application program is a shooting application, the recommended content comprises one or more of the following: encyclopedia information of a shooting subject, news of the shooting subject, news of a shooting scene, and encyclopedia information of the shooting scene;
when the first application program is a game application, the recommended content comprises one or more of the following: strategy information, event information, and news information; and
when the first application program is a video application, the recommended content comprises one or more of the following: review information, encyclopedia information, tidbits information, recommended video information, and creator information.

6. The method as claimed in claim 2, wherein the call out command is further configured to request to call out one or more target function icons corresponding to the first application program, and the method further comprises:
determining one or more function icons corresponding to the type information of the first application program as the one or more target function icons; and
displaying the one or more target function icons.

7. The method as claimed in claim 6, when the type information of the first application program is a game application, the one or more target function icons comprise one or more of the following: an on-hook icon, a virtual backpack icon, a virtual skill icon, a mute icon, a background cleaning icon, a screenshot icon, and a screen recording icon;
when the type information of the first application program is a video application, the one or more target function icons comprise one or more of the following: a play icon, a pause icon, a volume adjustment icon, and a brightness adjustment icon, a screenshot icon, and a screen recording icon;
when the first application program is a shooting application, the one or more target function icons comprise one or more of the following: a shooting setting icon, a filter selection icon, a flash icon, and a time-lapse shooting icon; and
when the first application is a reading application, the one or more target function icons comprise one or more of the following: a reading setting icon, a directory icon, a mode switching icon, a search icon, and a bookmark icon.

8. The method as claimed in claim 2, wherein the call out command is further configured to request to call out one or more target function icons corresponding to the first application program, and the method further comprises:
determining, based on the further correlation information, one or more function icons whose correlation with the first application program meets a first preset condition as the one or more target function icons; and
displaying the one or more target function icons.

9. The method as claimed in claim 8, wherein the determining, based on the further correlation information, one or more function icons whose correlation with the first application program meets a first preset condition as the one or more target function icons, comprises:
determining one or more function icons, whose usage frequency in a running process of the first application program is greater than a frequency threshold, as the one or more target function icons.

10. The method as claimed in claim 1, wherein displaying the one or more target application icons comprises:
displaying the one or more target application icons in a designated region and along an arc.

11. The method as claimed in claim 10, wherein the method further comprises: displaying, in the designated region, one or more target content icons and one or more target function icons corresponding to the first application program;
the designated region comprises a first sub-region and a second sub-region, the one or more target content icons are displayed in the first sub-region, and the one or more target function icons are displayed in the second sub-region.

12. The method as claimed in claim 10, wherein the method further comprises: displaying, in the designated region, one or more target content icons and one or more target function icons corresponding to the first application program;
the designated region comprises a first sub-region, a second sub-region and a third region, the one or more target content icons are displayed in the first sub-region, the one or more target function icons are displayed in the second sub-region, and the one or more target application icons are displayed in the third region.

13. The method as claimed in claim 10, wherein the special-shaped notch is configured to integrate at least one of the group consisting of a camera, a distance sensor, an earphone, and an ambient light brightness sensor, and the one or more target application icons are displayed along an arc and around the special-shaped notch.

14. The method as claimed in claim 1, wherein the receiving the call out command comprises:
determining the call out command is received when the click operation or press operation is sensed by at least one of a pressure sensing assembly, a distance sensing assembly and a light sensing assembly provided in the special-shaped notch.

15. The method as claimed in claim 1, wherein the one or more target application icons are displayed on the screen, and receiving the call out command further comprises:
determining the call out command is received when receiving a third trigger signal performed on a side region of the screen.

16. The method as claimed in claim 1, wherein an icon of the one or more target application icons is a specified type of icon, and the method further comprises:
highlighting the specified type of icon when displaying the one or more target application icons, by making the special-shaped notch emit neon light and making the special-shaped notch flash and glow within a preset time period.

17. A terminal, comprising a processor and a memory, the memory storing a computer program, the computer program being loaded and executed by the processor to perform an icon display method, the method comprises:
displaying a user interface of a first application program;
in response to receiving a call out command configured to request to call out one or more target application icons corresponding to the first application program, determining at least one application icon as the one or more target application icons according to correlation information of the first application program, wherein the correlation information indicates a correlation between one or more application icons and the first application program, and the determined at least one application icon corresponds to one or more applications each having a probability of running simultaneously with the first application program greater than a probability threshold;

displaying the one or more target application icons;

receiving a selection signal acting on one of the displayed one or more target application icons; and displaying a user interface of an application corresponding to the selected target application icon simultaneously with the user interface of the first application program, in such a manner that the user interface of the application corresponding to the selected target application icon and the user interface of the first application program are presented in different display modes depending on a form of the selection signal, comprising:

displaying the user interface of the application corresponding to the selected target application icon and the user interface of the first application program on the screen in a split-screen display mode, in response to detecting that the selection signal is a drag signal; and displaying the user interface of the application corresponding to the selected target application icon in a floating window presented on the user interface of the first application program, in response to detecting that the selection signal is only a double-click signal;

wherein the one or more target application icons and a float are displayed on a screen, and receiving the call out command further comprises:

determining the call out command is received when receiving a second trigger signal performed on the float, wherein a position where the float is displayed on the screen is determined according to an orientation of the terminal; and hiding the float according to a fifth trigger signal performed on the float, the fifth trigger signal being different from the second trigger signal.

18. A non-transitory computer-readable storage medium having a computer program stored thereon, wherein the computer program, when being executed by a processor, causes the processor to implement an icon display method comprising:

displaying a user interface of a first application program;

in response to receiving a call out command configured to request to call out one or more target application icons corresponding to the first application program, determining at least one application icon as the one or more target application icons according to correlation information of the first application program, wherein the correlation information indicates a correlation between one or more application icons and the first application program, and the determined at least one application icon corresponding to one or more applications each having a probability of running simultaneously with the first application program greater than a probability threshold; displaying the one or more target application icons;

receiving a selection signal acting on one of the displayed one or more target application icons; and displaying a user interface of an application corresponding to the selected target application icon simultaneously with the user interface of the first application program, in such a manner that the user interface of the application corresponding to the selected target application icon and the user interface of the first application program are presented in different display modes depending on a form of the selection signal, comprising:

displaying the user interface of the application corresponding to the selected target application icon and the user interface of the first application program in a split-screen display mode, in response to detecting that the selection signal is a drag signal; and displaying the user interface of the application corresponding to the selected target application icon in a floating window presented on the user interface of the first application program, in response to detecting that the selection signal is only a double-click signal;

wherein the one or more target application icons and a float are displayed on a screen, and receiving the call out command further comprises:

determining the call out command is received when receiving a second trigger signal performed on the float, wherein a position where the float is displayed on the screen is determined according to an orientation of the terminal; and hiding the float according to a fifth trigger signal performed on the float, the fifth trigger signal being different from the second trigger signal.

\* \* \* \* \*